United States Patent
Zhang et al.

(10) Patent No.: US 6,890,973 B2
(45) Date of Patent: May 10, 2005

(54) SYNDIOTACTIC POLYSTYRENE NANOCOMPOSITE AND MANUFACTURING METHOD THEREOF

(75) Inventors: Xuequan Zhang, Taejeon (KR); Jae Gon Lim, Taejeon (KR); Sung Cheol Yoon, Seoul (KR)

(73) Assignee: Aamsung Atofina Co., Ltd. (KR)

( * ) Notice: Subject to any disclaimer, the term of this patent is extended or adjusted under 35 U.S.C. 154(b) by 0 days.

(21) Appl. No.: 10/332,728

(22) PCT Filed: Jun. 29, 2001

(86) PCT No.: PCT/KR01/01122

§ 371 (c)(1),
(2), (4) Date: Jan. 27, 2003

(87) PCT Pub. No.: WO02/06394

PCT Pub. Date: Jan. 24, 2002

(65) Prior Publication Data

US 2004/0024103 A1 Feb. 5, 2004

(30) Foreign Application Priority Data

Jul. 18, 2000 (KR) ........................ 2000-40934

(51) Int. Cl.[7] ................................. C08K 9/10
(52) U.S. Cl. ................... 523/211; 523/202; 523/209; 523/210; 428/402; 428/404
(58) Field of Search ................... 523/211, 202, 523/209, 210; 428/402, 404, 522

(56) References Cited

U.S. PATENT DOCUMENTS 6,410,142 B1 * 6/2002 Chen et al. ................. 428/402

FOREIGN PATENT DOCUMENTS

| EP | 0 874 006 A1 | * 10/1998 |
| JP | 10-231311 | 9/1998 |
| JP | 11-049812 | 2/1999 |
| JP | 2000-086672 | 3/2000 |

OTHER PUBLICATIONS

Ishihra, N. et al, Journal of Macromolecules, *Crystalline Syndiotactic Polystyrene*, 1986, 19, pp. 2464–2465.

* cited by examiner

*Primary Examiner*—Ling Siu Choi
(74) *Attorney, Agent, or Firm*—Woodcock Washburn LLP (57) ABSTRACT

The syndiotactic polystyrene nanocomposite according to the present invention has nano silicate materials dispersed individually in a styrene polymer matrix by intercalation and exfoliation during polymerization. Besides, the syndiotactic polystyrene nanocomposite according to the present invention is prepared by using a catalytic system composed of a phyllosilicate-supported Group IVB transition metal catalyst and alkylaluminoxane, wherein the phyllosilicate-supported Group IVB transition metal catalyst comprises: a) a polymer, b) a phyllosilicate and c) a Group IVB transition metal compound, and the polymer (a) is used as an insulating material or media of the phyllosilicate (b) and the Group IVB transition metal compound (c).

6 Claims, 2 Drawing Sheets

SYNDIOTACTIC POLYSTYRENE NANOCOMPOSITE AND MANUFACTURING METHOD THEREOF

CROSS-REFERENCE TO RELATED APPLICATIONS

This patent is a national phase filing of PCT Patent Application PCT/KR01/01122 filed Jun. 29, 2001, which claims benefit to Republic of Korean application 2000/40934 filed Jul. 18, 2000.

FIELD OF THE INVENTION

The present invention relates to a new syndiotactic polystyrene nanocomposite and a method preparing the same. More particularly, the present invention relates to a syndiotactic polystyrene nanocomposite prepared by using a catalyst system composed of a phyllosilicate-supported IVB transition metal compound and alkylaluminoxane and a method preparing thereof. Further, the present invention relates to a syndiotactic polystyrene nanocomposite wherein a silicate material is dispersed individually by intercalation and exfoliation during polymerization, having better mechanical strength than that of correspondent non-nanocomposite polymer, which is prepared by using a nano clay supported catalyst, and a method preparing the same.

BACKGROUND OF THE INVENTION

Syndiotactic polystyrene (sPS) was first synthesized in 1985, using a homogeneous organometallic catalyst system based on a titanium compound and methylaluminoxane (MAO)(N. Ishihara, T. Seimiya, M. Kuramoto and M. Uoi, Macromolecules 1986, 19, 2465).

Syndiotactic polystyrene is a very attractive polymer. Its low specific gravity, low dielectric constant, high modulus of elasticity and excellent resistance to chemicals make syndiotactic polystyrene a promising material for a large number of applications in the automotive, electronic and packaging industries. However, sPS has poor impact strength.

Intensive researches to demonstrate the synthesis of sPS and the nature of other components, particularly catalysts and cocatalysts used in polymerization, have been conducted. However, problems in the polymerization process, such as reactor fouling and morphology control, have been revealed. Supported catalysts have been used to overcome said problems, but they have extremely low activity.

While the intensive researches on catalysts and polymerization process have been progressed, physical properties of syndiotactic polystyrene have been more focused. There are many patents about compounding and composite of syndiotactic polystyrene with other materials. Most of them disclose toughening of syndiotactic polystyrene by compounding with rubbery materials such as SEBS, SBS, SEP, SIS etc. The rest of them disclose compounding with other plastic materials such as polyolefin, nylon, polyesters etc. to balance physical properties of sPS or reduce cost However, there has not been a patent concerning syndiotactic polystyrene-based nanocomposite until now.

In general, phyllosilicates such as smectite clays, e.g., sodium montmorillonite and calcium montmorillonite are used for preparing polymer nanocomposites. Nonocomposites of nylon, PMMA, atactic polystyrene, polyester, etc. have been reported that they have substantially higher modulus and heat distortion temperature without significant increase of specific gravity as compared with corresponding neat polymers.

Several processes have been reported for preparation of a polymer nanocomposite. Melt mixing process is normally used for this propose, where planar silicate layers of clay are intercalated and exfoliated in the polymer matrix during the mixing process. Radical polymerization of a monomer in the presence of montmorillonite clay is another approach to obtain nanocomposite. However, polymerization via Ziegler-Natta or metallocene mechanism has difficulties because montmorillonite clay is hydrophobic.

Montmorillonite is hydrophobic which makes proper exfoliation and dispersion into conventional polymers difficult. Accordingly, special techniques are needed to disperse the layers of clay in nano-scale polymer matrix. The most common method is chemical treatment using organic compounds such as organic ammonium ion. The organic molecules are intercalated between adjacent planar silicate layers to increase the interlayer space between the adjacent silicate layers and to bond with a polymer.

Generally, the activity of a supported metallocene catalyst is about 1/100 times as low as that of a homogeneous catalyst. The preparation of a supported catalyst having an acceptable activity for syndiotactic polystyrene polymerization is more difficult because the polymerization activity of syndiotactic polystyrene is lower than that of polyolefine.

Direct loading of a metallocene catalyst on a montmorillonite clay is impossible because the support is hydrophobic.

Accordingly, the present invention discloses a new method for preparing a high activity metallocene supported catalyst system, particularly a supported catalyst for producing a syndiotactic polystyrene. Hydrophobic montmorillonite clay is used as a support and produces syndiotactic polystyrene having high activity.

The present invention provides a method for preparing new sPS nanocomposite and polyolefine nanocomposite by polymerization process using a nano-clay supported catalyst. The present invention provides sPS nanocomposite by the polymerization process and solves the problems of reactor fouling and morphology control when using a stirred-tank reactor.

OBJECTS OF THE INVENTION

A feature of the present invention is the provision of new syndiotactic polystyrene nanocomposite, wherein nano silicate is individually dispersed in the polystyrene matrix by intercalation and exfoliation during the polymerization.

Another feature of the present invention is the provision of a new method for preparing syndiotactic polystyrene nanocomposite by polymerization using a nano clay supported catalyst.

A further feature of the present invention is the provision of a new method for preparing syndiotactic polystyrene nanocomposite using a supported catalyst, thereby reactor fouling is minimized and morphology is easily controlled when using a stirred-tank reactor.

A further feature of the present invention is the provision of a new method for preparing syndiotactic polystyrene using a high activity supported metallocene catalyst system.

A further feature of the present invention is the provision of a syndiotactic polystyrene nanocomposite having improved mechanical strength comparing with that of a conventional syndiotactic polystyrene, wherein material layers are dispersed in the polymer matrix.

A further feature of the present invention is the provision of a method for preparing a high activity supported metallocene catalyst system applicable to polymerization of styrene monomer as well as olefin monomers.

The above and other objects and advantages of this invention will be apparent from the ensuing disclosure and appended claims.

SUMMARY OF THE INVENTION

The present invention relates to a new syndiotactic polystyrene nanocomposite and a manufacturing method thereof. The syndiotactic polystyrene nanocomposite according to the present invention, the recemic pentad of which is not less than 50%, has nano silicate materials dispersed individually in a styrene polymer matrix by intercalation and exfoliation during the polymerization. Besides, the syndiotactic polystyrene nanocomposite according to the present invention is prepared by using a catalyst system composed of a phyllosilicate-supported Group IVB transition metal catalyst and alkylaluminoxane, wherein the phyllosilicate-supported Group IVB transition metal catalyst comprises (a) a polymer, (b) a phyllosilicate and (c) a Group IVB transition metal compound and the polymer (a) is used as insulating material or media of the phyllosilicate (b) and the Group IVB transition metal compound (c).

DETAILED DESCRIPTION OF THE INVENTION

The present invention relates to a new syndiotactic polystyrene nanocomposite and a manufacturing method thereof. The syndiotactic polystyrene nanocomposite according to the present invention, the recemic pentad of which is not less than 50%, has nano silicate materials dispersed individually in the styrene polymer matrix by intercalation and exfoliation during the polymerization. Besides, the syndiotactic polystyrene nanocomposite according to the present invention is prepared by using a catalyst system composed of a phyllosilicate-supported Group IVB transition metal catalyst and alkylaluminoxane, wherein the phyllosilicate-supported Group IVB transition metal catalyst comprises (a) a polymer, (b) a phyllosilicate and (c) a Group IVB transition metal compound and the polymer (a) is used as insulating material or media of the phyllosilicate (b) and the Group IVB transition metal compound (c). A composition of a catalytic system for polymerization, a preparation process of a supported catalyst, and a preparation process of a syndiotactic polystyrene nanocomposite are described in details by followings.

Composition of Catalyst System
(a) Polymer

A polymer is used as an insulation material or media of phyllosilicate (b) and Group IVB transition metal compound (c).

The polymer of the present invention is a polymer or a copolymer having a polar group and the representative examples are acrylonitrile polymers and copolymers such as polyacrylonitrile, poly (styrene-co-acrylonitrile), poly (acrylonitrile-block-styrene), acrylonitrile-butadiene-styrene resin, poly (acrylonitrile-co-butadiene), poly (acrylonitrile-co-isoprene), etc.; hydroxyl polymers and copolymers such as poly (vinyl alcohol) and hydroxyl group-containing polymers and copolymers; acrylic and acrylate polymers and copolymers; maleic anhydride copolymers and maleic anhydride modified polymers; acetate polymers and copolymers; polyether polymers and copolymers; polyketone polymers and copolymers; polyamide polymers and copolymers; and polyurethane polymers and copolymers.

The styrene acrylonitrile copolymer (SAN) has a degree of polymerization of at least 5 and an acrylonitrile content of 0.1 to 100 wt %, preferably 2 to 50 wt %.

A content of the polymer (a) is not specifically limited, but an excess over 0.0001 wt % is preferred.

Insulation by Polymer

To keep the metallocene catalyst to be supported from poisonous surface of the support, without deterioration of the advantages of the supported catalyst is the key point in the present invention to obtain a high activity metallocene supported catalyst. Accordingly, a polymer is employed to completely insulate a homogeneous catalyst to be supported from poisonous surface of the support.

The polymer should be harmless to catalysis, interact with a catalyst and surface of support chemically or physically, and be insoluble in styrene monomer or polymerization solvent after loading a catalyst.

The polymer, which meets the above requirements, contains specified polar groups. The specified polar groups make the polymer completely be absorbed on the surface of the support to form an insulation film, somewhat like a coating process, by chemical or physical interaction with the surface of support. While the insulation layer is formed, which polar groups act as a media or a substitute for the support to load a homogeneous catalyst and absorb a metallocene catalyst to be supported by producing a stable complex.

With the insulation layer on the surface of the support, the intrinsic characteristic of the support is not so important as it used to be. But, the support itself provides morphology and high surface area. Therefore hydrophobic montmorillonite clay is usable as a metallocene catalyst support.

(b) Phyllosilicate

The phyllosilicate in the present invention is a nano-silicate material and includes smectite clays, such as sodium montmorillonite, calcium montmorillonite and hectorite clay, etc. Both original and chemically or physically modified clays are included.

The phyllosilicate is treated with polymer (a) having the fictional groups that react or interact with the phyllosilicate. Moreover, the phyllosilicate produces material layers individually dispersed in the syndiotactic polystyrene matrix by intercalation and exfoliation during sPS polymerization.

A content of phyllosilicate (b) is not specifically limited, but an excess over 70 wt % is preferred.

(c) Transition Metal Compound

The transition metal compound used as a homogeneous catalyst in the present inch is a Group IVB metal compound, which is represented as the general formula (I) or (I):

$$MR^1_a R^2_b R^3_c X_{4-(a+b+c)} \qquad (I)$$

$$MR^1_d R^2_e X_{3-(d+e)} \qquad (II)$$

where M is a Group IVB metal atom; $R^1$, $R^2$, and $R^3$ are a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an aryloxy group having

1 to 20 carbon atoms, a cyclopentadienyl group, a substituted cyclopentadienyl group or an indenyl group and may be the same or different; X is a halogen atom; a, b and c are an integer of 0 to 4; and d and e are an integer of 0 to 3.

Representative examples of the alkyl group having 1 to 20 carbon atoms as represented by $R^1$, $R^2$ or $R^3$ are a methyl group, an ethyl group, a propyl group, a butyl group, an amyl group, an isoamyl group, an isobytyl group, an octyl group and a 2-ethylhexyl group; those of the alkoxy group having 1 to 20 carbon atoms are a methoxy group, an ethoxy group, a propoxy group, a butoxy group, an amyloxy group, a hexyloxy group and a 2-ethylhexyloxy group; and those of the aryl, alkylaryl or arylalkyl having 6 to 20 carbon atoms are a phenyl group, a tolyl group, a xylyl group and a benzyl group.

The transition metal compound (c) used for preparing the supported catalyst according to the present invention further includes binuclear and multiple-nuclear catalysts in addition to single nuclear catalysts as described in formula (I) and (II).

The binuclear catalyst is represented as general formula (III), (IV) or (V):

$$R^1_d R^2_e X^1_{3-(d+e)} M^1 — O — R^4 — O — M^2 R^1_d R^2_e X^1_{3-(d+e)} \quad (III)$$

where $M^1$ and $M^2$ are a Group IVB metal atom; $R^4$, $R^5$ and $R^6$ are an alkyl group having 1 to 20 carbon atoms, an aryl group having 6 to 20 carbon atoms, an alkylaryl group having 6 to 20 carbon atoms, an arylalkyl group having 6 to 20 carbon atoms, a cyclopentadienyl group, a substituted cyclopentadienyl group or an indenyl group and may be the same or different; and f is an integer of 0 to 2.

Representative examples of the alkyl group having 1 to 20 carbon atoms as represented by $R^4$, $R^5$ or $R^6$ are a methyl group, an ethyl group, a propyl group, a butyl group, an amyl group, an isoamyl group, an isobutyl group, an octyl group and a 2-ethylhexyl group; and those of the aryl, alkylaryl or arylalkyl having 6 to 20 carbon atoms are a phenyl group, a tolyl group, a xylyl group and a benzyl group.

The multiple-nuclear catalyst is represented as general formula (VI):

$$R^7 —(O — M R^1_d R^2_e X^1_{3-(d+e)})_n \quad (VI)$$

where M is a Group IVB metal atom; $R^7$ is an alkyl group having 1 to 20 carbon atoms, an aryl group having 6 to 20 carbon atoms, an alkylaryl group having 6 to 20 carbon atoms, an arylalkyl group having 6 to 20 carbon atoms, or a polymer having a polymerization degree of 5 to 10,000; and n is an integer of 0 to 1,000.

The transition metal compound (c) may be used in single or as a combination of two or more types.

A content of the transition metal compound is not specifically limited, but about 0.001 to 30 wt % is preferred Cocatalyst The supported catalyst of the present invention is preferably used in combination with a cocatalyst to prepare a syndiotactic polystyrene. As a cocatalyst, alkylaluminoxane (d) is used in single or in combination with alkylaluminum compound (e).

(d) Alkylaluminoxane

In the preparation process of the supported catalyst of the present invention, an alkylaluminoxane compound is used, if necessary.

The alkylaluminoxane compound, which is produced by the reaction of an alkylaluminum and a condensation reagent such as water, is represented as the following general formula (VII):

(VII)

where $R^8$ is an alkyl group having 1 to 8 carbon atoms; and j is an integer of 2 to 50.

A chain structure of the alkylaluminoxane (d) represented as general formula (VII) may be linear or cyclic. A content of the alkylaluminoxane is not specifically limited, but about 0 to 50 wt % is preferred.

(e) Alkylaluminum Compound

In the preparation process of the supported catalyst in the present invention, an alkylaluminum compound, which is represented as general formula (VIII), can be used, if necessary:

$$AlR^9_3 \quad (VIII)$$

where $R^9$ is an alkyl group having 1 to 8 carbon atoms.

A content of the alkylaluminum compound (e) is not specially limited, but about 0 to 50 wt % is preferred.

The alkylaluminum compound is optionally used in the metallocene catalyst system of the present invention.

Preparation of Supported Catalyst

Figure 1:
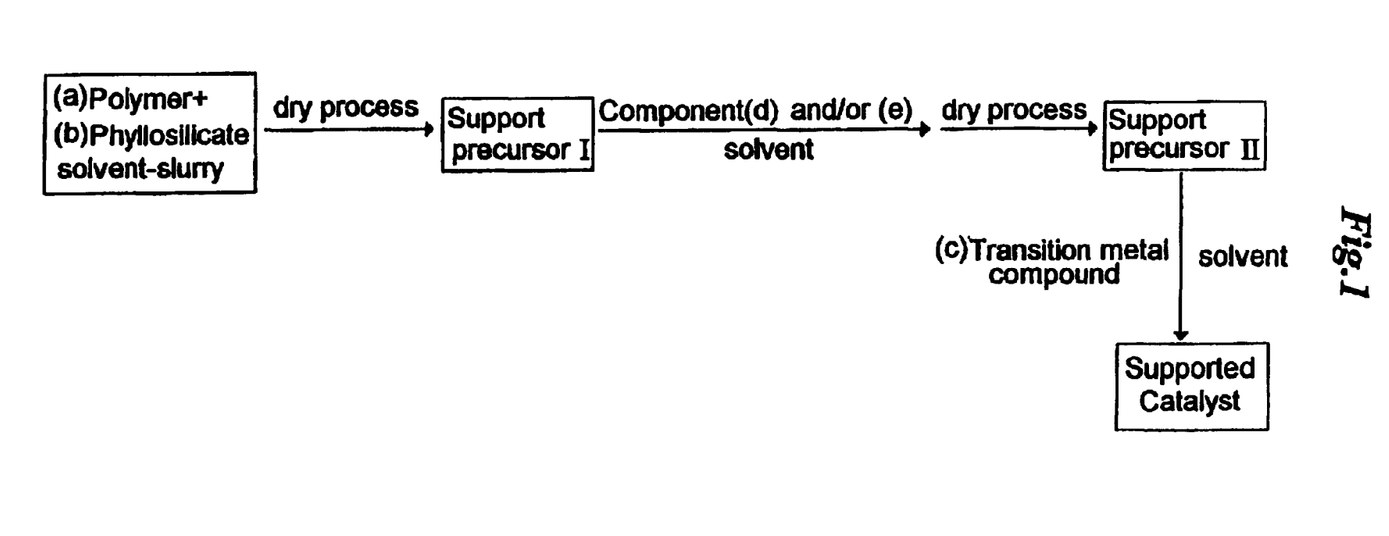
FIG. 1 shows a diagram of the preparation process of a supported catalyst according to the present invention.

Polymer (a) and phyllosilicate (b) are mixed with solvent. The resultant slurry is dried to obtain Support precursor I. To the Support precursor I, component (d) and/or (e) and solvent are added After dry process, Support precursor is obtained. By adding transition metal compound (c) to the Support precursor II, the supported catalyst of the present invention is prepared. A diagram of preparation process of the supported catalyst is shown in FIG. 1.

A solvent used for preparing the supported catalyst is not specifically limited, but aliphatic and aromatic hydrocarbon solvents are preferred A reaction temperature is usually –100 to 150° C., preferably 20 to 70° C.

Preparation of Syndiotactic Polystyrene Polymer

Monomer

A styrenic monomer for producing a syndiotactic polystyrene nanocomposite by using the supported catalyst system according to the present invention, is represented as the formula (IX):

(IX)

where $R^{10}$ is a hydrogen atom, a halogen atom, an alkyl group having 1 to 20 carbon atoms, or an oxygen atom, a nitrogen atom, a sulfur atom, a phosphorus atom or a silicon atom-containing group; and k is an integer of 1 to 3.

The styrenic monomer is homopolymerized or copolymerized when two or more styrenic monomers are used, by using the supported catalyst provided by the present invention.

The monomer polymerized by the supported catalyst provided by the present invention is not limited to a styrenic monomer, but an olefin monomer represented as the general formula (X) can be also polymerized and copolymerized, and the copolymerization can be carried out between olefin monomers or between olefin monomer and styrenic monomer:

(X)

where $R^{11}$ is a hydrogen atom, or a linear or a cyclic alkyl group having 1 to 20 carbon atoms.

Preparation of a Polymer

A melt polymerization is employed to polymerize a syndiotactic polystyrene nanocomposite by using the monomer and the supported catalyst under well-known equipments and reaction conditions, but the reaction is not specifically limited. Catalysts and/or cocatalysts may be injected to a reactor by various well-known techniques.

The prepared polymer is a syndiotactic polystyrene nanocomposite having high stereoregularity and phyllosilicate material layers individually dispersed in the syndiotactic polystyrene polymer matrix by intercalation and exfoliation during the polymerization.

The prepared syndiotactic polystyrene is represented as general formula (XI):

(XI)

where R is selected from the group consisting of a hydrogen atom, a halogen atom, or a carbon, oxygen, nitrogen, sulfur, phosphorous or silicon atom-containing group; m is an integer of 1 to 3, and when m is 2 or 3, R may be the same or different; n is a degree of polymerization of at least 100; the stereostructure is syndiotactic; and the stereoregularity is above 50% of recemic pentad.

Also, the syndiotactic polystyrene nanocomposite may have a structural unit represented as general formula (XI):

(XII)

where $R^1$ and $R^2$ are selected from the group consisting of a hydrogen atom, a halogen atom, or a carbon, oxygen, nitrogen, sulfur, phosphorous or silicon atom-containing group and may be the same or different; l and m are each 1, 2 or 3, and when l is 2 or 3, $R^1$ may be the same or different, and when m is 2 or 3, $R^2$ may be the same or different, n and n' are each a degree of polymerization of at least 100.

The invention may be better understood by reference to the following examples, which are intended for the purpose of illustration and are not to be construed as in any way limiting the scope of the present invention, which is defined in the claims appended hereto.

EXAMPLES

Examples 1–3

Polymerization by Sodium Montmorillonite-catalyst Support

Example 1

Preparation of Sodium Montmorillonite-catalyst Support

To a dried 250 ml flask equipped with a magnetic stirring bar, was added 20 g of sodium montmorillonite (produced by Southern Clay Products Inc., trade name: Cloisite, without chemical modification) and heated to 400° C. for 6 hours under vacuum. After cooling to room temperature, 1.0 g of SAN (poly(styrene-co-acrylonitrile)) (trade name: BF-9690, produced by Cheil Industries Inc., acrylonitrile content 23 wt %, Mw: 90,000) and 100 ml of toluene (distilled over sodium) were added under a nitrogen atmosphere. The resultant slurry was allowed to stir at a room temperature for 2 hours for complete dissolution of the SAN polymer, and then toluene was removed by decantation followed by vacuum Thus, a yellowish brown powder-like product was obtained. To the powder, was 2 mmol of methylaluminoxane (MAO) in 100 ml of toluene added at room temperature. The slurry was kept at room temperature with stirring for 30 minutes, and then toluene was removed by decantation followed by vacuum. As a result, a yellowish brown powder-like montmorillonite catalyst support was prepared.

Preparation of Syndiotactic Polystyrene

Montmorillonite-catalyst support of 4 g was weighed into a 25 ml vial in a dry box, then 0.02 mmol of Cp*Ti(OMe)$_3$ in 15 ml of toluene (distilled over sodium) solution was added by syringe. The slurry was kept at room temperature for 1 hour.

To a dried 1 liter-glass reactor, equipped with a circulation water jacket for temperature control and a steel anchor-paddle impeller, were added 200 ml of purified styrene monomer and 2 ml of triisobutylaluminum (40 mmol/L-SM). The solution was stirred at 70° C. and 400 rpm for 10 minutes, and then 0.71 ml of 2.83 M methylaluminoxane (2 mmol) toluene solution and the catalyst slurry prepared above were injected. The molar ratio of [MAO]/[Ti] was 100. The polymerization was quenched by a large amount of methanol after 1 hour. The polymer was filtered and dried by vacuum at 150° C. As a result, 97.3 g of powder polymer was obtained. The conversion was 53.5%, the activity was 4.86 kg/mmol-Ti-hr and the montmorillonite clay content was 4.1 wt %.

Figure 2:
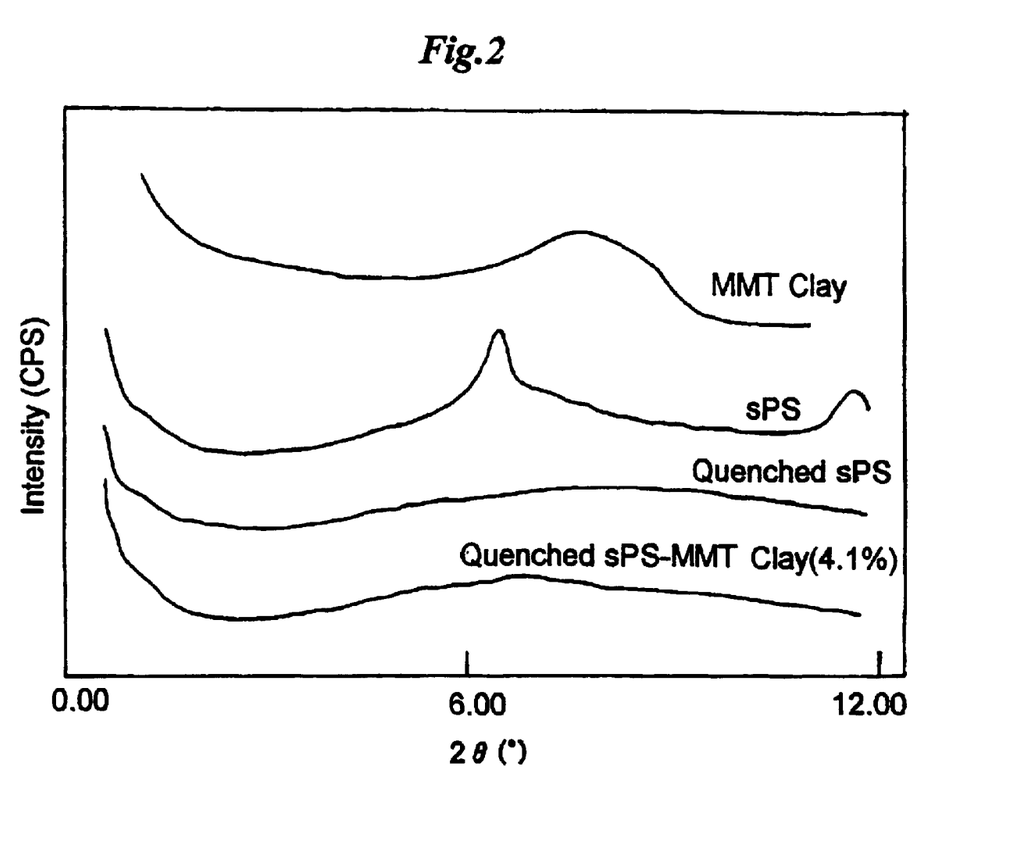
FIG. 2 shows a wide angle X-ray diffraction pattern of a syndiotactic polystyrene montmorillonite (MMT)-clay nanocomposite, which supports that the MMT-clay in a polystyrene matrix is completely exfoliated by showing disappearance of MMT crystalline peak in sPS clay sample according to the present invention.

The obtained polymer was analyzed with X-ray. The X-ray measurement was on a Rint 2000 (produced by Rigaku, Japan) using CuKα 1 at 40 kV and 50 mA. FIG. 2 is a wide angle X-ray diffraction spectrum pattern of a syndiotactic polystyrene montmorillonite (MMT)-clay nanocomposite. For prevention of overlap of sPS crystalline peak and clay crystalline peak, a specimen was molded into sheet at 280° C., then quenched into a liquid nitrogen bath, to be an amorphous syndiotactic polystyrene. An MMT crystalline peak in sPS clay specimen was completely disappeared as shown in FIG. 2, which supported that an MMT-clay in a syndiotactic polystyrene matrix was completely exfoliated.

The obtained polymer was analyzed by $^{13}C$ NMR and DSC to be a highly syndiotactic polystyrene with the melting point of 270° C.

Polymer powder of 70 g was pressed into a 150×150×3 mm sheet on a hot-plate at 280° C., and then cut into pieces. The flexural modulus and notched Izod impact strength were determined by ASTM test methods (ASTM D-790 for a flexural modulus and ASTM D-256 for a notched Izod impact strength), to be 38,280 kgf/cm$^2$ and 0.8 kgfcm/cm$^2$, respectively.

Example 2

Example 2 was conducted in the same manner as in Example 1 except that the amount of a cocatalyst (methylaluminoxane) was increased. The molar ratio of [MAO]/[Ti] was 200. The conversion was 64.7%, the activity was 5.88 kg/mmol-Ti-hr and the montmorillonite clay content was 3.4 wt %. The flexural modulus was 35,410 kg/cm$^2$ and the notched Izod impact strength was 0.9 kgf cm/cm$^2$, according to the same method as Example 1.

Example 3

Example 3 was conducted in the same manner as in Example 1 except that the amount of a cocatalyst (methylaluminoxane) was increased. The molar ratio of [MAO]/[Ti] was 300. The conversion was 78.6%, the activity was 7.14 kg/mmol-Ti-hr and the montmorillonite clay content was 2.8 wt %. The flexural modulus was 32,586 kgf/cm$^2$ and the notched Izod impact strength was 15 kgfcm/cm$^2$, according to the same method as Example 1. The polymerization conditions and the mechanical properties of the polymer obtained from Examples 1–3 are listed in Table 1.

Examples 4
Polymerization by Modified Montmorillonite-catalyst Support
Preparation of Modified Montmorillonite-catalyst Support To a dried 250 ml flask equipped with a magnetic stirring bar, was added 20 g of montmorillonite modified with dimethyl diethoxymethyl hydrogenated tallow ammonium salt at 95 MER (produced by Southern Clay Products Inc., trade name: Cloisite 30A, interlayer spacing 18.6272 Å) and heated to 400° C. for 6 hours under vacuum After cooling to room temperature, 1.0 g of SAN (poly(styrene-co-acrylonitrile))(trade name: BF-9690, produced by Cheil Industries Inc., acrylonitrile content: 23 wt %, Mw: 90,000) and 100 ml of toluene (distilled over sodium) were added under a nitrogen atmosphere. The resultant slurry was allowed to stir at a room temperature for 2 hours for complete dissolution of the SAN polymer, and then toluene was removed by decantation followed by vacuum. Thus, a yellowish brown powder-like product was obtained. To the powder, 2 mmol of methylaluminoxane (MAO) in 80 ml of toluene (distilled over sodium) was added at room temperature. The slurry was kept at room temperature with stirring for 30 minutes, and then toluene was removed by decantation followed by vacuum. As a result, a yellowish brown powder-like montmorillonite catalyst support was prepared.
Preparation of a Syndiotactic Polystyrene Montmorillonite (modified with dimethyl diethoxymethyl hydrogenated tallow ammonium salt at 9MER) catalyst suit of 2 g was weighed into a 25 ml vial in a dry box, then 0.137 mmol of Cp*Ti(OMe)$_3$ in 15 ml of toluene (distilled over sodium) solution was added by syringe. The slurry was kept at room temperature for 1 hour.

To a dried 1 liter-glass reactor, equipped with a circulation water jacket for temperature control and a steel anchor-paddle impeller, were added 200 ml of purified styrene monomer and 2 ml of triisobutylaluminum (40 mmol/L-SM). The solution was stirred at 70° C. and 400 rpm for 10 minutes, and then 4.84 ml of 2.83 M methylaluminoxane (13.7 mmol) toluene solution and the catalyst slurry prepared above were injected. The molar ratio of [MAO]/[Ti] was 100. The polymerization was quenched by a large amount of methanol after 1 hour. The polymer was filtered and dried by vacuum at 150° C. As a result, 74.1 g of powder polymer was obtained. The conversion was 40.8%, the activity was 540 g/mmol-Ti-hr and the montmorillonite clay content was 2.7 wt %.

Polymer powder of 70 g was pressed into a 150×150×3 mm sheet on a hot-plate at 280° C., and then cut into pieces. The flexural modulus and the notched Izod impact strength were determined by ASTM test methods (ASTM D-790 for a flexural modulus and ASTM D-256 for a notched Izod impact strength), to be 35,750 kgf/cm$^2$ and 1.2 kgfcm/cm$^2$, respectively.

Comparative Examples 1–3
Polymerization by Silica-catalyst Support

Comparative Example 1
Preparation of Silica-catalyst Support

To a dried 250 ml flask equipped with a magnetic stirring bar, were added 10 g of silica (produced by Davison Chemical Co., dried at 600° C. for 6 hours before use), 0.5 g of SAN (poly(styrene-co-acrylonitrile)) (trade name: BF-9690, produced by Cheil Industries Inc., acrylonitrile content 23 wt %, Mw: 90,000) and 80 ml of toluene (distilled over sodium) under a nitrogen atmosphere. The resultant slurry was allowed to stir at room temperature for 2 hours for complete dissolution of the SAN polymer, and then toluene was removed by decantation followed by vacuum. Thus, a white well-flow powder was obtained. To the white powder, 2 mmol of methylaluminoxane (MAO) in 80 ml of toluene (distilled over sodium) was added at room temperature. The slurry was allowed to stir for 30 minutes at room temperature, and then toluene was removed by decantation followed by vacuum. As a result, a finely divided white solid was obtained as a silica-catalyst support.
Preparation of Syndiotactic Polystyrene Silica catalyst support of 0.2 g was weighed into a 25 ml vial in a dry box, then 0.04 mmol of Cp*Ti(OMe)$_3$ in 15 ml of toluene (distilled over sodium) solution was added by syringe. The slurry was kept at room temperature for 1 hour.

To a dried 1 liter glass reactor equipped with a circulation water jacket for temperature control and a steel anchor-paddle impeller, 200 ml of purified styrene monomer and 2 ml of triisobutylaluminum (40 mmol/L-SM) were added The solution was stirred at 70° C. and 400 rpm for 10 minutes, and then 1.41 ml of 2.83 M methylaluminoxane (4 mmol) toluene solution and the catalyst slurry prepared above were injected The polymerization was quenched with a large amount of methanol after 1 hour. The polymer was filtered and dried by vacuum at 150° C. As a result, 104.9 g of powder polymer was obtained with negligible reactor fouling. The conversion was 57.7%, and the activity was 2.62 kg/mmol-Ti-hr.

The obtained polymer was analyzed by $^{13}$C NMR and DSC to be a highly syndiotactic polystyrene with the melting point of 270° C. The weight-average molecular weight (Mw) and the molecular weight distribution (Mw/Mn) were measured with GPC to be 493,100 and 1.90, respectively.

Polymer powder of 70 g was pressed into a 150×150×3 mm sheet on a hot-plate at 280° C., and then cut into pieces. The flexural modulus and the notched Izod impact strength were determined by ASTM test methods (ASTM D-790 for a flexural modulus and ASTM D-256 for a notched Izod impact strength), to be 28,360 kgf/cm$^2$ and 0.65 kgfcm/cm$^2$, respectively.

Comparative Example 2

To a dried 1 liter glass reactor equipped with a circulation water jacket for temperature control and a steel anchor-paddle impeller, 200 ml of purified styrene monomer and 2 ml of triisobutylaluminum (40 mmol/L-SM) were added. The solution was stirred at 70° C. and 400 rpm for 10 minutes, and then 0.71 ml of 2.83 M methylaluminoxane (2 mmol) toluene solution and 0.02 mmol of homogeneous catalyst, Cp*Ti(OMe)$_3$ in 15 ml of toluene (distilled over sodium) solution were injected. The system became highly viscous and finally became a lump in about 2~3 minutes since polymerization had started. The polymerization could not be continued because the system could not be agitated. The polymerization was quenched with methanol.

Comparative Example 3

As shown in Comparative Example 2, the homogeneous catalyst, Cp*Ti(OMe)$_3$, was directly fed to a stirred-tank reactor, and lump polymer was obtained. Therefore, prepolymerization and successive feeding of a catalyst and a cocatalyst (time interval: 5 minutes, total feeding time: 30 minutes) were taken.

Prepolymerization

To a dried 1 liter glass reactor equipped with a circulation water jacket for temperature control and a steel anchor-paddle impeller, 200 ml of purified styrene monomer and 8 ml of triisobutylaluminum (160 mmol/L-SM) were added. The solution was stirred at 70° C. and 300 rpm for 10 minutes, and then 0.25 ml of 2.83 M methylaluminoxane (0.72 mmol) toluene solution and 0.0072 mmol of the homogeneous catalyst, Cp*Ti(OMe)$_3$ in 2 ml of toluene (distilled over sodium) solution were injected. The prepolymerization was proceeded for 1 hour.

Polymerization

The polymerization was started by injection of 0.16 ml of 2.83M methylaluminoxane (0.47 mmol) and 0.047 mmol of the homogeneous catalyst, Cp*Ti(OMe)$_3$. 0.47 mmol of MAO and 0.0047 mmol of Cp*Ti(OMe)$_3$ were repeatedly injected 7 times in interval of 5 minutes until the total amount of MAO and Cp*Ti(OMe)$_3$ (including MAO and catalyst in prepolymerization) were reached 4 mmol and 0.04 mmol, respectively. The injection time of the catalyst and MAO was 30 minutes and the polymerization was proceeded for another 30 minutes. The polymerization was terminated with a large amount of methanol. Finally, a fine polymer was obtained with serious reactor and impeller fouling. The total yield was 121.8 g, the conversion was 67.0%, the reactor fouling was 25% and the activity was 1.52 kg/mmol-Ti-hr. The polymerization conditions were shown in Table 1.

TABLE 1

|  | Examples | | | | Comparative Examples | | |
| --- | --- | --- | --- | --- | --- | --- | --- |
|  | 1 | 2 | 3 | 4 | 1[e] | 2 | 3[f] |
| [Ti] (μmol/L-SM) | 100 | 100 | 100 | 685 | 200 | 100 | 200 |
| Amount of clay catalyst suppot[a](g) | 4 | 4 | 4 | 2 | 0 | 0 | 0 |
| [MAO]/[Ti] | 100 | 200 | 300 | 100 | 100 | 100 | 100 |
| Conversion (wt %) | 53.5 | 64.7 | 78.6 | 40.8 | 57.7 | lump | 67.0 |
| Activity (kg/mmol-Ti-hr) | 4.86 | 5.88 | 7.14 | 0.54 | 2.62 | lump | 1.52 |
| Clay content[b] (wt %) | 4.1 | 3.4 | 2.8 | 2.7 | 0 | lump | 0 |
| Flexural Modulus[c] (kgf/cm$^2$) | 38,280 | 35,410 | 32,586 | 35,750 | 28,360 | lump | 26,990 |
| Notched Izod Impact Strength[d] (kgfcm/cm$^2$) | 0.80 | 0.90 | 1.50 | 1.2 | 0.65 | lump | 0.67 |

Notes:
[a]Examples 1–3: Natural sodium montmorillonite Produced by Southern Clay Products, Inc., trade name: Closite
Example 4: modified montmorillonite Produced by Southern Clay Products, Inc., trade name: Closite 30A
[b][Amount of clay catalyst support (g)]/[Total yield (g)]
[c]ASTM D 790
[d]ASTM D 256
[e]Silica-catalyst support
[f]Cp*Ti (OMe)$_3$ In the above Examples and Comparative Examples except Comparative Example 3, the polymerization temperature was 70° C.; the concentration of TIBA was 40 mmol/L-SM; and the polymerization time was 1 hour, and in Comparative Example 3, the concentraction of TIBA was 160 mmol/L-SM; and the polymerization time (prepolymerization+polymerization) was 2.5 hours.

As shown in Table 1, the productivity by a clay-supported catalyst was higher than that by a silica-supported catalyst, and even higher than that by a homogeneous catalyst in Comparative Example 3. The reactor fouling by the supported catalyst was negligible, whereas that by a homogeneous catalyst was terrible. More imply, the flexural modulus of syndiotactic polystyrene by the montmorillonite clay-supported catalyst was much higher than that of syndiotactic polystyrene without clay, without drop of impact strength, and sPS nanocomposite was prepared by polymerization using the clay-supported catalyst.

FIG. 2 is the X-ray diffraction pattern showing disappearance of clay crystalline peak (2 θ=8.06°) in sPS nanocomposite by using the clay-supported catalyst, which supports complete exfoliation of planar layers of clay.

X-ray measurement was on a Rint 2000 (produced by Rigaku, Japan), using CuK α 1 at 40 kV and 50 mA. For prevention of overlap of sPS crystalline peak and clay crystalline peak, a specimen was molded into sheet at 280° C., then quenched into a liquid nitrogen bath.

The present invention can be easily carried out by an ordinary skilled person in the art Many modifications and changes may be deemed to be with the scope of the present invention as defined in the following claims.

What is claimed is:

1. A process of preparing a syndiotactic polystyrene nanocomposite, which comprises (A) contacting (a) a polymer having a polar group, (b) a nano phyllosilicate, and (c) a Group IVB transition metal compound to form a phyllosilicate-supported Group IVB transition metal compound and (B) polymerizing styrenic monomers under a catalyst system composed of the phyllosilicate-supported Group IVB transition metal compound and an alkylaluminoxane, wherein the polymer(a) insulates the Group IVB transition metal compound (c) from the surface of the phyllosilicate (b) such that the Group IVB transition metal compound (c) does not react with the surface of the phyllosilicate (b).

2. A process of preparing a syndiotactic polystyrene nanocomposite, which comprises (A) contacting (a) a polymer having a polar group, (b) a nano phyllosilicate, (c) a Group IVB transition metal compound, (d) an alkylaluminoxane, and (e) an alkylaluminum compound to form a phyllosilicate-supported Group IVB transition metal compound and (B) polymerizing styrenic monomers under a catalyst system composed of the phyllosilicate-supported Group IVB transition metal compound and an alkylaluminoxane, wherein the polymer(a) insulates the Group IVB transition metal compound (c) from the surface of the phyllosilicate (b) such that the Group IVB transition metal compound (c) does not react with the surface of the phyllosilicate (b).

3. The process in claim 1, wherein said polymer (a) is harmless to the catalysis, interacts with the catalyst and surface of the support chemically or physically; and is insoluble in styrenic monomer or polymerization solvent after loading a catalyst.

4. The process of claim 1 wherein said polymer (a) containing a polar group is selected from the group consisting of an acrylonitrile-containing polymer or copolymer, a hydroxyl group-containing polymer or copolymer, an acrylic or acrylate polymer or copolymer, a maleic anhydride-containing copolymer, an acetate-containing polymer or copolymer, a polyether polymer or copolymer, a polyketone polymer or copolymer, and a polyamide polymer or copolymer.

5. The process in claim 4, wherein said acrylonitrile-containing polymer is poly(styrene-co-acrylonitrile)(SAN) having a degree of polymerization of at least 5 and an acrylonitrile content in the polymer of 0.1 to 100 wt %.

6. The process of claim 1, wherein said polymerization is melt mixing polymerization.

* * * * *

UNITED STATES PATENT AND TRADEMARK OFFICE
CERTIFICATE OF CORRECTION

PATENT NO. : 6,890,973 B2
DATED : May 10, 2005
INVENTOR(S) : Xuequan Zhang et al.

It is certified that error appears in the above-identified patent and that said Letters Patent is hereby corrected as shown below:

<u>Title page,</u>
Item [73], Assignee, "Aamsung Atofina Co., Ltd." should read -- Samsung Atofina Co., Ltd. --.

Signed and Sealed this

Sixth Day of September, 2005

JON W. DUDAS
*Director of the United States Patent and Trademark Office*